United States Patent
Groth (10) Patent No.: US 10,197,995 B2
(45) Date of Patent: Feb. 5, 2019

(54) CONTROL DEVICE AND METHOD FOR CONTROLLING A PRINTED PRODUCT PROCESSING SYSTEM

(75) Inventor: Uwe Groth, Hinwil (CH)

(73) Assignee: FERAG AG, Hinwil (CH)

( * ) Notice: Subject to any disclaimer, the term of this patent is extended or adjusted under 35 U.S.C. 154(b) by 838 days.

(21) Appl. No.: 14/007,316

(22) PCT Filed: Mar. 22, 2012

(86) PCT No.: PCT/CH2012/000066
§ 371 (c)(1),
(2), (4) Date: Nov. 14, 2013

(87) PCT Pub. No.: WO2012/126130
PCT Pub. Date: Sep. 27, 2012

(65) Prior Publication Data
US 2014/0135969 A1    May 15, 2014

(30) Foreign Application Priority Data
Mar. 24, 2011 (CH) .......................... 537/11

(51) Int. Cl.
*G05B 19/418* (2006.01)

(52) U.S. Cl.
CPC ... *G05B 19/4189* (2013.01); *G05B 19/41865* (2013.01); *G05B 2219/32037* (2013.01); *Y02P 90/20* (2015.11); *Y02P 90/28* (2015.11)

(58) Field of Classification Search
CPC .......... G05B 19/4189; G05B 19/41865; G05B 2219/32037; Y02P 90/20; Y02P 90/28
(Continued)

(56) References Cited

U.S. PATENT DOCUMENTS

| 4,958,292 A | 9/1990 | Kaneko et al. |
| 5,346,196 A | 9/1994 | Nussbaum et al. |

(Continued)

FOREIGN PATENT DOCUMENTS

| EP | 0 435 451 A2 | 7/1991 |
| EP | 1 338 542 A1 | 8/2003 |

(Continued)

OTHER PUBLICATIONS

International Search Report dated Aug. 28, 2012, International Application No. PCT/CH2012/000066 filed Mar. 22, 2012.

*Primary Examiner* — Kenneth M Lo
*Assistant Examiner* — Michael J Huntley
(74) *Attorney, Agent, or Firm* — Knobbe, Martens, Olson & Bear, LLP (57) ABSTRACT

The disclosure relates to the control of a printed product processing system, which comprises a collecting system having a conveyer and a plurality of feed conveyers for creating product collections from products fed by the feed conveyers, occupancy plans are generated and stored which specify, for the feed conveyers, in each case a chronological sequence of the products to be fed by the feed conveyer to the conveyer to create the product collections. On the basis of the occupancy plans, for the feed conveyers, in each case one product to be fed is determined and transmitted to mobile transport devices. The occupancy plans enable the operating personnel to announce early and in good time which products the feed conveyers are to be occupied with and which must for this purpose be supplied thereto on pallets.

16 Claims, 6 Drawing Sheets

(58) Field of Classification Search
USPC .......................................................... 700/112
See application file for complete search history.

(56) References Cited

U.S. PATENT DOCUMENTS

| | | | | |
|---|---|---|---|---|
| 5,924,546 A | * | 7/1999 | Funaya | ................ B65G 47/256 |
| | | | | 198/395 |
| 2002/0143423 A1 | * | 10/2002 | Huber | .............. G05B 19/41865 |
| | | | | 700/121 |
| 2002/0149497 A1 | | 10/2002 | Jaggi | |
| 2003/0023418 A1 | * | 1/2003 | Kikuchi | ................. G06Q 10/04 |
| | | | | 703/6 |
| 2003/0171845 A1 | | 9/2003 | Flores et al. | |
| 2004/0227641 A1 | * | 11/2004 | Bieber | ............... G05B 19/0428 |
| | | | | 340/8.1 |
| 2008/0300705 A1 | | 12/2008 | Bagchi et al. | |
| 2012/0232942 A1 | * | 9/2012 | Gaug | .................... G06Q 10/06 |
| | | | | 705/7.12 |
| 2013/0060376 A1 | * | 3/2013 | Forster | ................... B65H 5/085 |
| | | | | 700/218 |

FOREIGN PATENT DOCUMENTS

| | | | | |
|---|---|---|---|---|
| EP | 1338542 A1 | * | 8/2003 | ............. B65H 39/04 |
| JP | 2000-198509 A | | 7/2000 | |

\* cited by examiner

Fig. 6

CONTROL DEVICE AND METHOD FOR CONTROLLING A PRINTED PRODUCT PROCESSING SYSTEM This application is the U.S. National Phase under 35 U.S.C. § 371 of International Application No. PCT/CH2012/000066, filed Mar. 22, 2012, which claims priority to Swiss Application No. 00537/11, filed Mar. 24, 2011.

TECHNICAL FIELD

The present invention relates to a computerized control device and a computer-implemented method for controlling a printed product processing system. The present invention relates in particular to a computerized control device and a computer-implemented method for controlling a printed product processing system that comprises a collecting system having a conveyor and a plurality of feed conveyors for creating product collections from products, in particular printed products, supplied by the feed conveyors.

PRIOR ART

In known collecting systems for putting together product collections composed of a plurality of products by gathering, inserting or collating, the various products are supplied sequentially by a plurality of serially arranged feed conveyors to a conveyor, where they are gathered, inserted or collated, for example on or in collection carriers such as grippers. In printed product processing systems, the products comprise in particular flat printed products of various thickness but also other flat products such as data storage media or other inserts, for example. The product collections created from the products are supplied sequentially by the conveyor to one or more finishing systems, for example for the purpose of insertion, shrink-wrapping, binding, gluing, cutting and/or stacking. A collecting system configured for gathering products is typically implemented using a circulating conveyor. A circulating conveyor enables the movement of products, product collections or collection carriers along a closed curve or track cyclically past the product-supplying feed conveyors. Certain products or product collections can thereby perform a plurality of cycles on the circulating conveyor, and therefore they are supplied multiple times to the gathering process before being transferred to a finishing system.

Before and during production, the feed conveyors must be loaded manually by operating personnel of the printed product processing system with the products to be supplied. The products are typically brought to the feed conveyors on pallets, and in order to load a feed conveyor, the products are packed by operating personnel in stacks or bundles from a pallet into the feed conveyor concerned. If a pallet is empty and/or if the feed conveyor is meant to be loaded with a different product, the empty or currently unused pallet must be moved away and a new pallet holding the product to be supplied must be moved to the feed conveyor, for example by means of a pallet truck. In printed product processing systems having a large number of feed conveyors, for example several dozen or more than a hundred, and on which a production process shall be carried out to create a plurality of different product collections from an even greater number of different products to be supplied, for example more than a hundred or several hundred different inserts, the moving to and fro of pallets using a relatively large number of feed conveyors, in particular more than twenty conveyors, and products to be supplied results increasingly in a considerable amount of work and coordination effort involving a corresponding amount of time and personnel. A delay in bringing up a single pallet and hence a delay in loading a feed conveyor with the product to be supplied usually lead to production delays and/or result in creating incorrect product collections and to these product collections being discarded.

PRESENTATION OF THE INVENTION

The object of the present invention is to propose a computerized control device and a computer-implemented method for controlling a printed product processing system comprising collecting system which does not have at least some of the disadvantages of the known systems. In particular it is an object of the present invention to propose a computerized control device and a computer-implemented method for controlling a printed product processing system comprising collecting system that enable improved and coordinated loading of feed conveyors of the collecting system in order to achieve a higher net performance of the printed product processing system.

According to the present invention, these objects are achieved by the elements of the independent claims. The dependent claims and the description also contain further advantageous embodiments.

The above-mentioned objectives are achieved by the present invention, for the purpose of controlling a printed product processing system that comprises a collecting system having a conveyor and a multiplicity of feed conveyors for creating product collections from different types of products supplied by the feed conveyors, in particular by generating and saving in a computerized control device one or more loading plans, which define for each of the feed conveyors a time sequence of the products that are to be supplied to the conveyor by the feed conveyor for a defined production process of a plurality of different product collections, each to be created from a plurality of supplied products. In the computerized control device, the products to be supplied, which are each to be supplied by one of the feed conveyors to the conveyor for creating the product collections, are determined on the basis of the loading plans. Information about the determined products to be supplied is transmitted via a wireless communications channel in each case to a mobile display device for displaying the products to be supplied to the feed conveyor concerned. The information about the determined products to be supplied is transmitted via the wireless communications channel for example in each case to the display device of a mobile handling device for bringing up to the feed conveyor concerned the products to be supplied. Generating loading plans for the feed conveyors of the collecting system and determining on the basis thereof products to be supplied sequentially to the conveyor by the feed conveyors make it possible to display to the operating personnel or to the mobile handling devices which product in each case is to be supplied to the conveyor by one of the feed conveyors at the present and/or imminent moment in time. The operating personnel or the mobile handling devices can thereby be informed in advance and in good time, which products are to be loaded on the feed conveyors.

In a preferred embodiment variant, during the defined production process the products supplied by the feed conveyors to the conveyor are recorded, an imminent change in the type of the product to be supplied for one of the feed conveyors is determined in the computerized control device on the basis of the loading plans, and information about the product to be loaded on the feed conveyor for the imminent change is transmitted via the wireless communications channel to the mobile display device. The information about the product to be loaded on the feed conveyor for the imminent change is transmitted via the wireless communications channel for example to the display device of a mobile handling device. The number of products that are conveyed is thereby determined and continuously updated. The loading plans and the continuous recording of the products supplied by the feed conveyors make it possible to establish, for each feed conveyor with reference to the allocated loading plan, the current production status and an imminent product change. The operating personnel or the mobile handling devices can thereby be informed in advance and in good time about an imminent product change and the associated movement of product pallets up to/away from the feed conveyor.

In one embodiment variant, in the computerized control device, during the defined production process and on the basis of the loading plans, a time interval until an imminent change in the type of product to be supplied for one of the feed conveyors is determined, and the time interval transmitted to the mobile display device via the wireless communications channel. The time interval is transmitted via the wireless communications channel for example to the display device of a mobile handling device. The additional information about the time period or the point in time of the imminent product change enables the operating personnel or the mobile handling devices to schedule and perform in good time the moving-up and -back of product pallets and the subsequent loading of the feed conveyor.

A graphical representation and the orientation of the products to be supplied are preferably displayed on a display of the feed conveyor concerned, and information about the products to be supplied is transmitted to the mobile display device, for instance the display device of a mobile handling device, via the wireless communications channel for the purpose of graphical display of the products to be supplied.

In a preferred embodiment variant, the loading plans for the defined production process are generated in the computerized control device according to defined optimization rules. The optimization rules that are used to generate the loading plans are preferably determined from the defined optimization rules on the basis of one of a plurality of possible optimization objectives. By optimizing the loading of the feed conveyors, the production process on the printed product processing system is improved in accordance with the selected optimization objectives, i.e. the available resources such as production time, operating personnel, printed product processing system, system components etc. are used as efficiently as possible according to a selected optimization objective.

In a further embodiment variant, in the computerized control device a plurality of records containing different loading plans for the feed conveyors are generated and saved for different possible production conditions. The production conditions here define in each case a possible configuration of the printed product processing system, the availability of operating personnel of the printed product processing system and/or an optimization objective. In the computerized control device, current production conditions of the printed product processing system for the defined production process are recorded and one of the records of the loading plans is selected for the defined production process on the basis of the current production conditions. Generating and saving loading plans for different production conditions enables an efficient and flexible configuration of the feed conveyors for a production process under different production conditions. This also allows for problem situations that occur outside the printed product processing system to be taken into account, for instance a late arrival of a heavy goods vehicle.

In one embodiment variant, in the computerized control device during the defined production process, current production conditions of the printed product processing system are recorded that define the current configurations of the printed product processing system, the current availability of operating staff of the printed product processing system and/or a current optimization objective, and the loading plans are adapted in the computerized control device during the defined production process on the basis of the current production conditions of the printed product processing system. Adapting loading plans during the production process to current production conditions enables dynamic reconfiguration of the feed conveyors to changed production conditions. This allows both system-internal and external factors and problems to be taken into account.

In a further embodiment variant, in the computerized control device a plurality of records containing different loading plans for the feed conveyors are generated for the defined production process. The defined production process is simulated for the different records of the different loading plans and each simulation determines a system-specific simulated production time period. The record containing loading plans having the shortest simulated production time period is used for the defined production process.

In addition to a computerized control device and a computer-implemented method for controlling a printed product processing system, the present invention also relates to a computer program product which comprises a handleable computer-readable storage medium containing stored computer code. The computer code is configured to control one or more processors of the control device such that the processors, or the control device, execute a method for controlling a printed product processing system that comprises a collecting system having a conveyor and a multiplicity of feed conveyors for creating product collections from various types of products supplied by the feed conveyors. The processors, or the control device, here generate and save one or more loading plans, which define for each of the feed conveyors a time sequence of the products that are to be supplied to the conveyor by the feed conveyor for a defined production process of a plurality of different product collections each to be created from a plurality of supplied products. The processors, or the control device, determine on the basis of the loading plans the products to be supplied, each of which are to be supplied by one of the feed conveyors to the conveyor for creating the product collections, and transmit information about the defined products to be supplied to the feed conveyor concerned via a wireless communications channel in each case to a mobile display device, for example to the mobile display device of a mobile handling device for bringing up to the feed conveyor concerned the products to be supplied.

SHORT DESCRIPTION OF THE DRAWINGS

An embodiment of the present invention is described below with reference to an example. The example given by the embodiment is illustrated by the following enclosed figures.

WAYS OF IMPLEMENTING THE INVENTION

Figure 1:
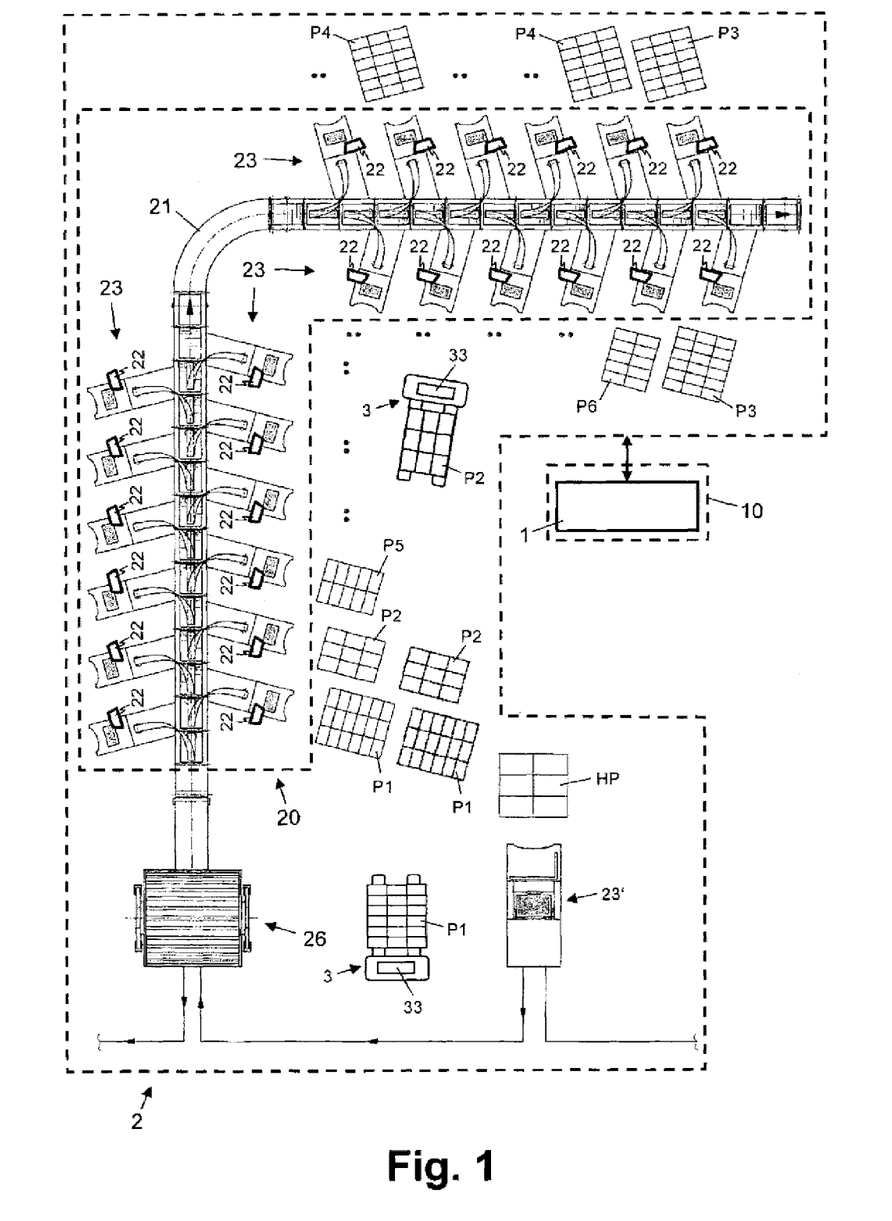
FIG. 1: shows a block diagram which illustrates schematically a computer-controlled printed product processing system which comprises a collecting system having a conveyor and a plurality of feed conveyors for creating product collections.
Figure 2:
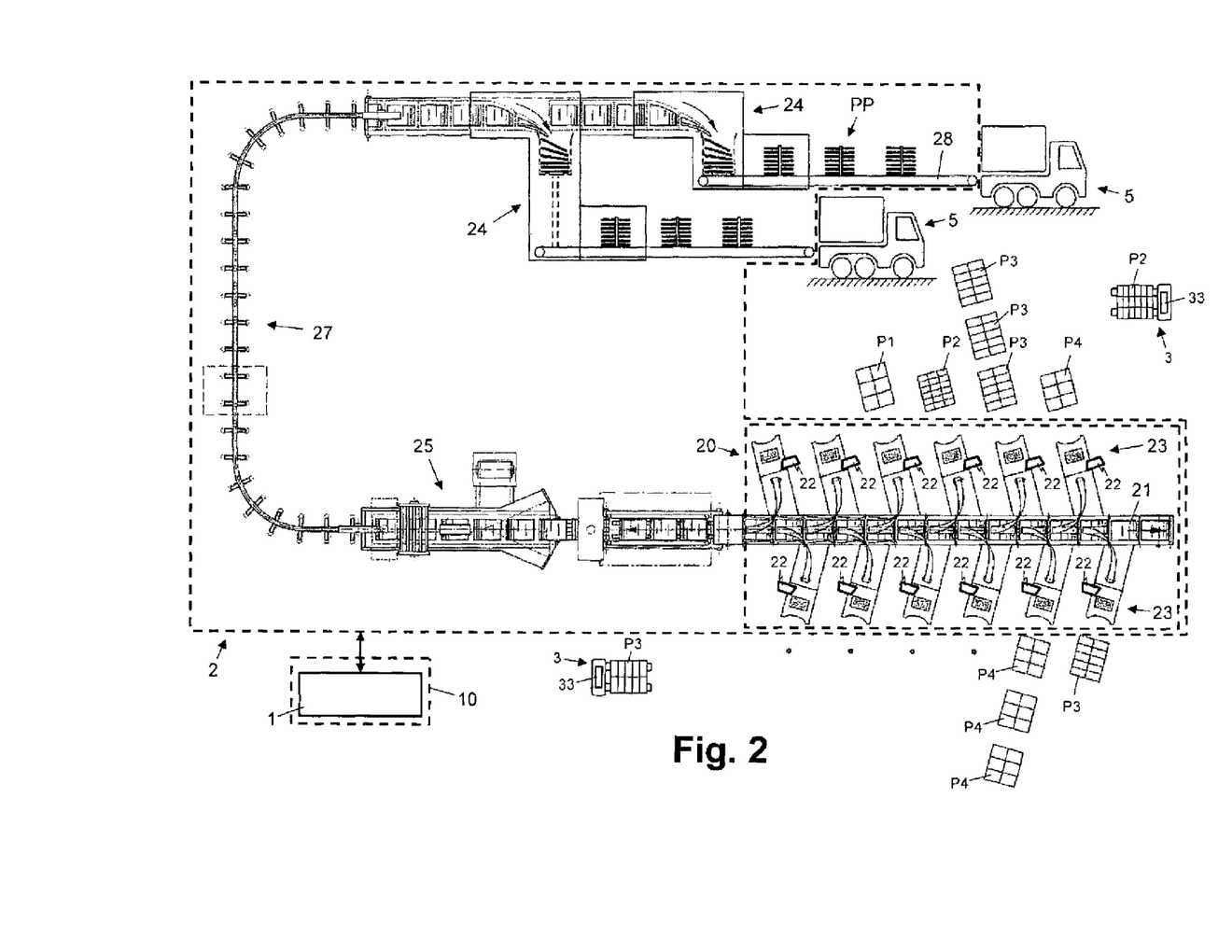
FIG. 2: shows a block diagram which illustrates schematically a further computer-controlled printed product processing system which comprises a collecting system having a conveyor and a plurality of feed conveyors for creating product collections and comprises a plurality of downstream stacking stations.
Figure 6:
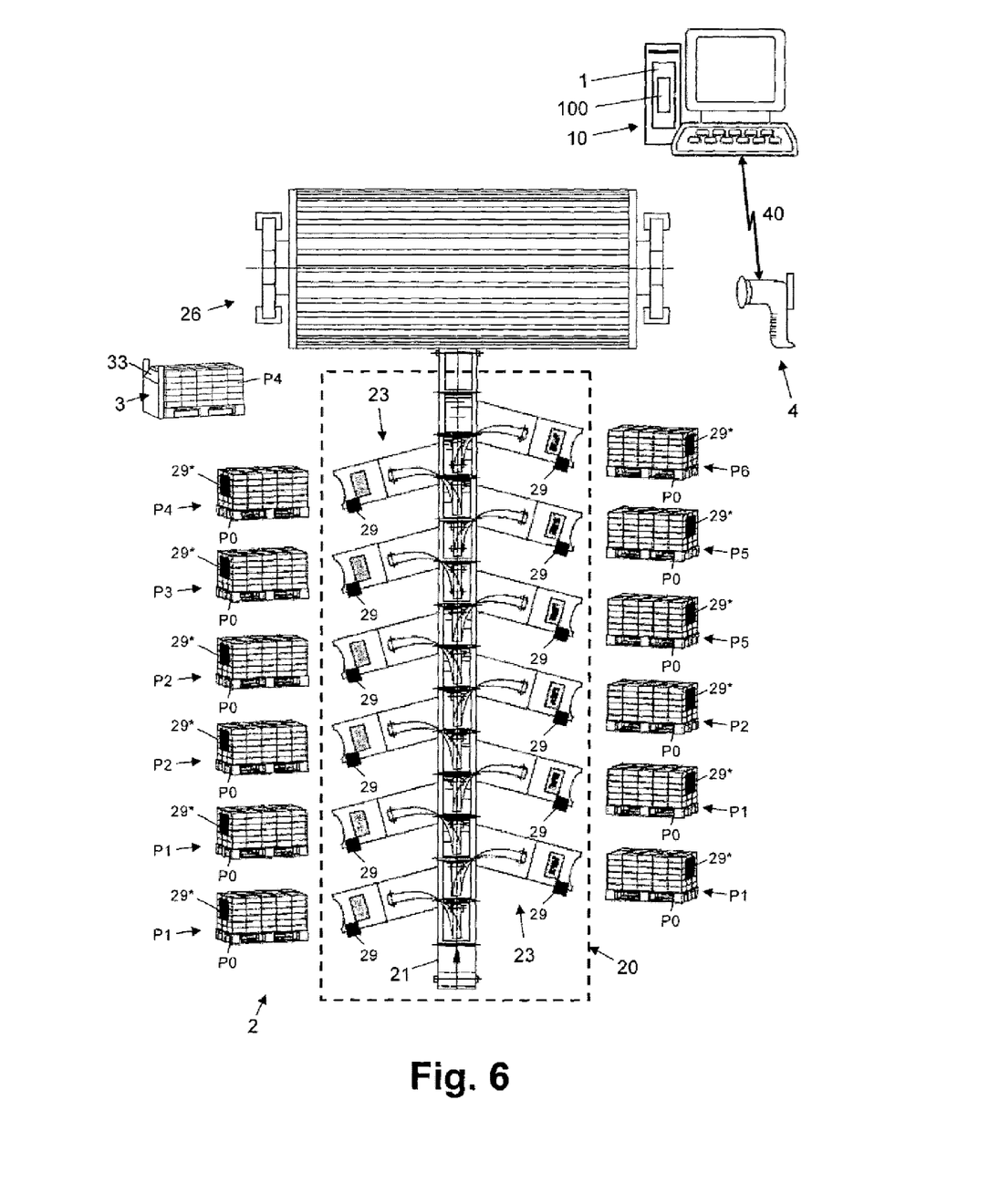
FIG. 6: shows a block diagram which illustrates schematically a further computer-controlled printed product processing system which comprises a collecting system having a conveyor and a plurality of feed conveyors, which are provided with identifying devices, for creating product collections.

In FIGS. 1, 2 and 6, reference sign 2 denotes a computer-controlled printed product processing system comprising a collecting system 20. The collecting system 20 comprises at least one conveyor 21 and a multiplicity of supply conveyors 23, which each supply different products P1, P2, P3, P4, P5, P6 (P1-P6) to the conveyor 21 according to which product is loaded on the respective supply conveyor. The collecting system 20 comprises, for example, several dozen or more than one hundred supply conveyors 23. Depending on the application, a plurality of supply conveyors 23 are loaded with the same product (split operation), for example for thick products P3, P4, where manual loading of an individual supply conveyor 23 by operating personnel of the printed product processing system 2 is too slow to cover the non-stop supply of products P1-P6 to the conveyor 21 by a single feed conveyor 23 (uninterrupted production), or as a backup to compensate for any failures of feed conveyors 23 (maximum production reliability). The number of different products P1-P6 that are meant to be supplied during a production process for creating different product collections is typically greater than the number of feed conveyors 23 of the printed product processing system 2.

In different embodiment variants, the collecting system 20 is configured to create combinations of products, here referred to as product collections, by gathering, inserting or collating products or by other product-combining operations, and accordingly comprises a conveyor 21 having a gathering line comprising circulating conveying means, a collecting drum, a belt conveyor for gathering shingled streams or a collecting line, each with or without collection carriers, for example grippers.

The examples of the collecting systems 20 shown in FIGS. 1, 2 and 6 each comprise a conveyor 21 having a plurality of serially arranged collection carriers, for example grippers, pods, pockets or saddles, which are carried along a closed line cyclically past the feed conveyors 23 and which receive the supplied products P1-P6. A product collection is assembled on the conveyor 21, in particular on or in the collection carriers, by the sequential supply of the products P1-P6.

As shown schematically in FIGS. 1, 2 and 6, the printed product processing system 2 comprises in different embodiment variants one or more finishing systems, which are connected downstream of the collecting system 20, for example via a transfer unit. Such finishing systems comprise, for example, one or more stacking stations 24, a packaging facility 25 e.g. a shrink-wrap machine, an apparatus 26, for example a rotating insertion drum, for inserting additional products P1-P6 or product collections into a main product HP from a corresponding feed conveyor 23', a binding machine.

The fully assembled product collections, which may also have undergone finishing processes, are supplied, for example as illustrated in FIG. 2, via a further conveyor 27, for example a chain conveyor having grippers, to one of, for instance, a plurality of stacking stations 24, which creates a package PP containing a defined number of product collections, and supplies said package to an outgoing conveyor 28 in order to be carried away, which conveyor, for instance, is a belt conveyor and supplies the package to an allocated heavy goods vehicle 5 for dispatch according to a planned route.

In order to count supplied products P1-P6, incorrect product collections, incomplete and surplus product collections, and/or created packages PP, the printed product processing system 2 additionally comprises various counters, which are not shown. Incorrect product collections in the printed product processing system 2 are here detected by various sensors (not shown) and supplied, for example by a wastepaper shunt line, away from the conveyor 21 to a wastepaper reject gate.

In FIGS. 1 and 2, the reference signs 22 denote displays, which are each mounted at or on one of the feed conveyors 23 so as to be easily visible for the operating personnel of the printed product processing system 2. The displays 22 are LCD or LED displays, for example. In FIG. 6, the reference signs 29 denote identifying devices, which depending on the embodiment variant are implemented as machine-readable identifiers, for example a barcode or an RFID (Radio Frequency IDentifier), or as an identifier reader, for example a barcode reader, an RFID reader or an image sensor (digital camera). To aid understanding, it should be mentioned here that, depending on the embodiment variant, the feed conveyors 23 shown in FIGS. 1 and 2 can each be provided with identifying devices 29, and that also the feed conveyors 23 shown in FIG. 6 can each be provided with a display 22, even if this is not shown explicitly in FIG. 1, 2 or 6.

For the purpose of control, the printed product processing system 2 comprises a control computer 10, which is connected to the various components and units of the printed product processing system 2 via communications links, in particular to the collecting system 20, the conveyor 21, the supplying feed conveyors 23 and associated displays 22, and to any finishing systems, controllable transfer units and/or wastepaper shunt lines, stacking stations 24, further conveyors 27, 28 and to the mentioned sensors and counters. As shown schematically in FIG. 6, the control computer 10 comprises a function module, verification module 100, the function of which will be described in detail later.

The control computer 10 is configured to track the product collections or incomplete collections conveyed on the conveyor 21 as regards the position of said collections on the conveyor 21, the content and structure of said collections (i.e. products and order), the intended and/or modified collection type (having defined collection structure) and/or the number of completed cycles on the conveyor 21 (tracking information). In order to create customized product collections, which are provided for example with the individual address of a recipient and/or are provided with content, and hence structure of the product collection, that is customized to the recipient concerned, a product collection is identified and tracked in the printed product processing system 2 by the control computer 10 over the entire creation time of said collection from the first supplying conveyor 23 on the conveyor 21 to stacking on a specified package PP.

The reference sign 1 denotes a computerized control device which is implemented as part of the control computer 10 or on one or more separate computers connected to the control computer 10. The control device 1 is connected by means of communications links directly or via the control computer 10 to the components and units of the printed product processing system 2, in particular to the supplying feed conveyors 23 and associated displays 22.

The control device 1 and/or the control computer 10 can preferably be connected to a higher-level computerized control system (not shown). The control device 1 and/or the control computer 10 can additionally be connected via one or more wireless (contactless) communications channels, for example via a WLAN (Wireless Local Area Network), Bluetooth or another radio-based communications link, to mobile display devices 33, for example to mobile display devices 33 which are each built into a mobile handling device 3 or implemented as a portable computerized handheld unit.

The mobile handling devices 3 are handling vehicles, for example pallet trucks 3, in particular low-loader pallet trucks, for handling pallets P0 each holding one or more stacks of one of the products P1-P6 in each case. The mobile handling devices 3 have an electrical drive, for example, and are controlled by an operating person or by an automatic handling controller, depending on the embodiment variant. The mobile handling devices 3 or computerized hand-held units each comprise a communications module for exchanging data with the control device 1 and/or the control computer 10 via the wireless communications channel. The mobile handling devices 3 or computerized hand-held units additionally each comprise a display device (display) 33 for displaying information about the products P1-P6 that must be moved to the feed conveyors 23, 23', in particular a graphical representation of the product P1-P6 to be moved and a graphical and/or numerical representation of the point in time and/or the time interval until the product P1-P6 concerned must be available at a specific feed conveyor 23, 23'. The mobile handling devices 3 or the computerized hand-held units preferably also comprise input means for confirming completed product handling jobs and/or requesting new product handling jobs.

Figure 3:
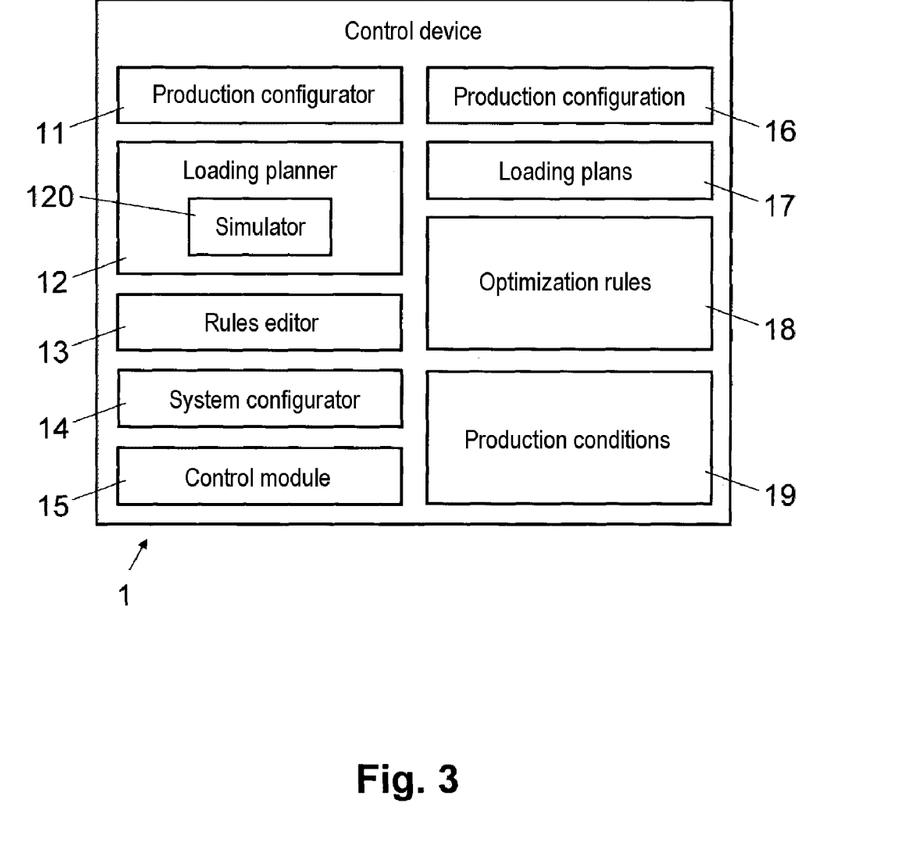
FIG. 3: shows a block diagram which illustrates schematically a computerized control device that is configured to control a printed product processing system which comprises a collecting system having a conveyor and a multiplicity of feed conveyors for creating product collections.

As shown schematically in FIG. 3, the control device 1 comprises various function modules, in particular a production configurator 11, a loading planner 12, a simulator 120, a rules editor 13, a system configurator 14 and a control module 15, and also data memories or program memories for storing production configurations 16, loading plans 17, optimization rules 18 and production conditions 19. In one embodiment variant, the control device 1 additionally comprises the verification module 100 mentioned above in connection with the control computer 10. The production configurations 16 comprise production configuration parameters, which define at least one production process of a plurality of different product collections, each to be created from a plurality of supplied products P1-P6 and each allocated an appropriate collection type. The production configuration parameters furthermore comprise route data, which defines the dispatch of created packages PP and includes an allocation of product collections to routes. The loading plans 17 define for each of the feed conveyors 23 a time sequence of the products P1-P6 that are to be supplied to the conveyor 21 by the feed conveyor 23 concerned to create the defined product collections of a production process. The optimization rules 18 comprise data and/or executable/interpretable code which defines the creation of loading plans for the feed conveyors 21, which loading plans have been optimized to meet as closely as possible one or more defined optimization objectives. The production conditions 19 comprise system configuration parameters, which define the configuration of the printed product processing system 2, information about the availability of operating personnel of the printed product processing system 2 and at least one optimization objective.

The function modules of the control device 1 or of the control computer 10 are preferably implemented as programmed software modules which comprise computer program code for controlling one or more processors of one or more computers. The computer program code is stored on one or more (handleable) computer-readable storage media connected permanently or removably to the processors. A person skilled in the art will understand, however, that the function modules can be implemented in alternative embodiment variants partially or entirely by hardware components.

Figure 4:
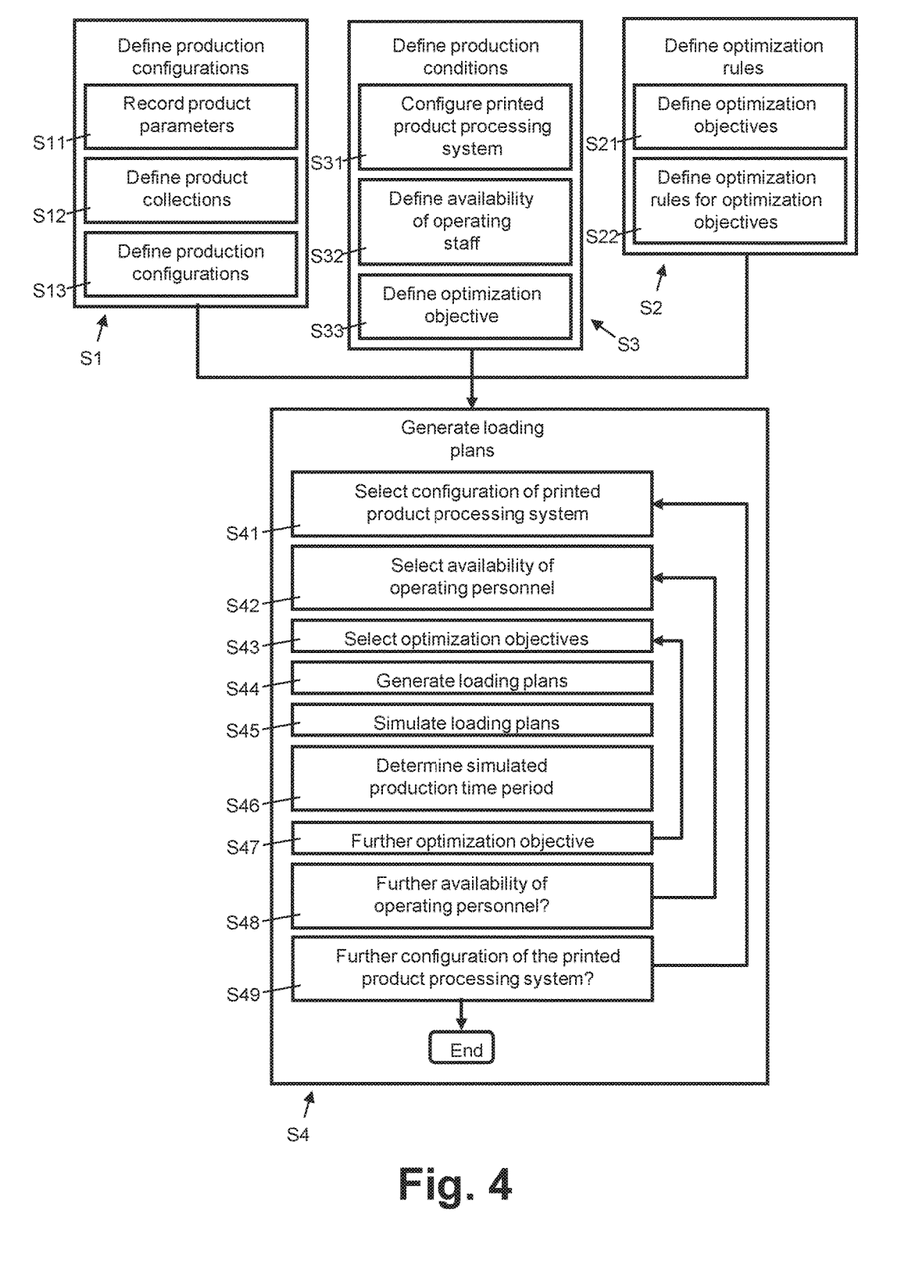
FIG. 4: shows a flow diagram that illustrates an example of a sequence of steps for generating loading plans for a multiplicity of feed conveyors of a printed product processing system for creating product collections from products supplied by the feed conveyors.

The various functions, for the execution of which the function modules are configured, are described in the following paragraphs with reference to FIGS. 4 and 5, which illustrate flow diagrams containing examples of sequences of possible steps for generating loading plans 16 or for configuring and controlling the printed product processing system 2.

The production configurator 11 is configured to define production configurations 16 in step S1.

For this purpose, in step S11, the production configurator 11 records and saves product parameters containing information about the individual products P1-P6. The product parameters comprise, for example, the geometric dimensions, in particular thickness, width and length, the weight, the type, a product identifier and a displayable electronic image of a product P1-P6.

In step S12, the production configurator 11 in addition records and saves definitions of product collections (collection type) containing information about the structure of a product collection, each structure comprising an identifier of the individual products P1-P6 and, if applicable, a stipulated and therefore monitored order of the products P1-P6 in the product collection.

In step S13, the production configurator 11 records and saves definitions of production configurations 16 containing production configuration parameters, which define at least one production process, i.e. one production run, of a plurality of different product collections. In one embodiment variant, the production configurator 11 records and saves production configurations 16 which comprise a plurality of sub-production processes, where each of the sub-production processes corresponds to one self-contained production process of a plurality of different product collections each to be created from a plurality of supplied products, i.e. each sub-production process has a production time period having a production start and a production end, during which no product collections from a different sub-production process are created.

The production configuration parameters in each case comprise the quantity and an identifier (collection type) of the different product collections in a production process or sub-production process. Depending on the embodiment variant, the production configuration parameters additionally comprise route information for the efficient dispatch of packages PP containing product collections and/or comprise address information for dispatching packages PP or product collections.

In one variant, at least some of the production configuration parameters are transmitted from the higher-level control system to the production configurator 11.

The production configurator 11 preferably comprises a user interface (for example a graphical user interface) having display and controls for entering, by adding, editing and/or deleting, the production configurations 16 described above, for example during preparation for the production process and/or during the production process. The production configurator 11 is moreover configured to receive and save production configuration parameters, for example product parameters, in the form of files.

The rules editor 13 is configured to define optimization rules 18 in step S2.

For this purpose, in step S21, the rules editor 13 records and saves definitions of optimization objectives. The optimization objectives specify an optimization priority, which shall be used as the basis for planning, for a production process or sub-production process, a loading of the feed conveyors 21 that is optimized to the maximum possible extent. Possible optimization objectives comprise, for example, "minimum number of operating personnel", "number of available operating personnel", "uninterrupted production process", "uninterrupted sub-production process", "maximum production reliability", "minimum production time", "maximum production speed", "minimum waste", "optimum stacking according to route planning", "avoiding downtime during product change", etc.

In step S22, the rules editor 13 records and saves definitions of optimization rules 18, each of which can be allocated to one of the defined optimization objectives. The optimization rules 18 comprise, for example, a rule identifier, a rule name and preferably executable or interpretable rule code, for instance rule programs containing executable or interpretable rule instructions. The rule code can be imported, for example, as a file or entered by means of a text editor or program editor. A general optimization rule, for example named "homogeneity maximization", comprises, for instance, rule code which sorts the product collections to be created in a production process or sub-production process such that the products which must be supplied most frequently are supplied as far as possible without interruption and without a product change by the same feed conveyor(s) 23. A general optimization rule, for example named "uninterrupted product change", comprises, for instance, rule code that schedules in the loading plan a product change for a feed conveyor such that it falls within a production phase in which the product collections to be created are covered by products P1-P6 being fed from other feed conveyors 23, thereby avoiding any gap in production.

The rule editor 13 preferably comprises a user interface (for example a graphical user interface) having display and controls for entering, by adding, editing and/or deleting, the optimization rules 18 described above prior to production planning. The optimization rules 18 are typically relatively static and are rarely changed if they have been tried and tested in production or on the basis of a simulation by the simulator 120. For this purpose, quantitative experience-based values are preferably saved in association with the optimization rules 18, for example a production speed as a number of processed products and/or created production collections per production time period, a personnel efficiency as a number of operating persons per number of processed products and/or created product collections, loading efficiency as a number of product changes for the feed conveyors 23 per production time period, number of processed products and/or created product collections, a production efficiency as a number of production interruptions per number of processed products, created product collections and/or per production time period, etc.

The system configurator 14 is configured to define production conditions 19 in step S3. The system configurator 14 is configured in particular to define, save and retrieve production conditions 19 for a plurality of different production scenarios.

For this purpose, in step S31, the system configurator 14 records and saves system configuration parameters which define the configuration of the printed product processing system 2. The system configuration parameters comprise, for example, information about the quantity, the type and/or the function of the feed conveyors 23, the position of the feed conveyors 23 on the conveyor 21, e.g. a sequential position number, the quantity and the type of operational and/or activatable stacking stations 24, the position with respect to the conveyor 21, 27 of the activatable stacking stations 24, the quantity of wastepaper shunt lines, the position of the wastepaper shunt lines, the quantity, type (function) and/or position of the finishing systems and activatable processing devices, etc.

In step S32, the system configurator 14 in addition records and saves the availability of operating personnel for the printed product processing system 2. The availability information comprises, for example, the number of operating persons who are available or are meant to be available for manual loading of feed conveyors 23 with the products to be supplied during specified time periods.

In step S33, the system configurator 14 records and saves a defined optimization objective, which shall be used as the basis for planning, for a production process or sub-production process, a loading of the feed conveyors 21 that is optimized to the maximum possible extent. A plurality of possibly conflicting optimization objectives each having a different allocated priority can also be recorded and saved. One or more optimization objectives are selected, for example, from a list containing defined optimization objectives. The optimization objectives hence specify an optimization priority and comprise, for example, "minimum number of operating personnel", "number of available operating personnel", "uninterrupted production process", "uninterrupted sub-production process", "maximum production reliability", "minimum production time", "maximum production speed", "minimum waste", "optimum stacking according to route planning", "avoiding downtime during product change", etc.

In one variant, at least some of the production conditions 19 are transmitted from the higher-level control system to the system configurator 14.

The system configurator 14 preferably comprises a user interface (for instance a graphical user interface) having display and controls for entering, by adding, editing and/or deleting, the production conditions 19 described above, for example during installation of the printed product processing system 2, during preparation for the production process and/or during the production process. In one variant, the system configurator 14 is also configured to record and save at least some system configuration parameters automatically by retrieval from the various components of the printed product processing system 2 via communications links, these system configuration parameters of the printed product processing system 2 being not only static but also dynamic, whereby the system configuration is updated at the time of production automatically, in particular also with regard to available or failing system components. Dynamic recording of system configuration parameters is performed, for example, cyclically and/or on request or on user instruction. The production conditions for various production scenarios are recorded and saved preferably "off-line", not during a production run.

The loading planner 12 is configured to generate in step S4 loading plans 17 for a specific production process or sub-production process defined by a saved production configuration 16.

For this purpose, in step S41, the loading planner 12 selects one of the configurations of the printed product finishing system 2 that are defined by the saved system configuration parameters.

In step S42, the loading planner 12 selects one of the defined variants of the available operating personnel of the printed product finishing system 2.

In step S43, the loading planner 12 selects one of the defined optimization objectives or a defined record of differently prioritized or weighted optimization objectives.

The parameters selected in steps S41, S42 and S43 define production conditions 19 for a specific production scenario.

In step S44, the loading planner 12 generates loading plans 17 for the feed conveyors 23 for the defined production process or sub-production process and the production conditions selected in steps S41, S42 and S43. The loading planner 12 here generates the loading plans 17 on the basis of the optimization rules 18 allocated to the optimization objective selected in step S43. If a plurality of optimization rules are allocated to an optimization objective, those optimization rules that are allocated the highest experience-based values are selected. The loading plans 17 are generated by executing or interpreting the defined optimization rules 18. The loading plans 17 define for each of the feed conveyors 23 a time sequence of the products P1-P6 that are to be supplied to the conveyor 21 by the feed conveyor 23 concerned for creating the product collections of the production process. Depending on the embodiment variant, the loading plans 17 for all the feed conveyors 23 are combined in a common loading master plan or divided into individual loading sub-plans.

A loading plan 17 defines for a feed conveyor 23 the supply sequence of the products P1-P6. This specifies, for example, as illustrated in table 1, the quantity of products P1, P3, P4 that are to be supplied to the feed conveyor 23 without interruption by a different product before it is necessary to perform a product change and hence load the feed conveyor 23 with a different product P1-P6.

TABLE 1

| Loading plan for a feed conveyor | | |
|---|---|---|
| Time/Cycle | Product/Break | Quantity/ time length |
| 1 | P3 | 4000 |
| 4001 | — | 200 |
| 4201 | P1 | 2000 |
| 6201 | — | 100 |
| 6301 | P4 | 1500 |

TABLE 1-continued

| Loading plan for a feed conveyor | | |
|---|---|---|
| Time/Cycle | Product/Break | Quantity/ time length |
| 7801 | — | 200 |
| ... | ... | ... |

In addition to specifying the order of the products in a loading plan table, the loading plan 17 can also specify, for instance, the time sequence by giving extra details about the time of supply or the first supply cycle. Any planned interruptions in supply "-" between two products to be supplied successively are specified explicitly or follow implicitly from the specified time of supply or supply cycle.

The record of individual loading plans 17 for the feed conveyors, or the loading master plan, is saved in association with the production conditions 19 of the production process or sub-production process that were defined in steps S41, S42 and S43.

In step S46, the production process is simulated for the allocated production conditions 19 by the simulator 120 according to the loading plans 17 generated in step S44. In the simulation, each load change for a feed conveyor 23 is based on a defined expected duration of a supply interruption caused by this load change and which depends, for example, on the type of the new product P1-P6 to be supplied.

In step S47, an expected production time period is determined on the basis of the simulation carried out and is saved in association with the loading plans 17.

Depending on the optimization rules 18 to be applied, by repeating the step sequence S44, S45, S46, a plurality of different loading plans 17 for the feed conveyors 23 are generated for the selected production conditions, and corresponding values for the production time periods are determined and stored. In one embodiment variant, the optimization rules 18 here define specific variables and parameters, each value of which is defined in multiple passes, for example by a random number generator or according to stipulated rules, so as to generate different records of loading plans 17 each containing different simulated production time periods. Finally, the record of loading plans 17 having the shortest simulated production time period is saved as the preferred variant for the selected production conditions 19.

In step S47, the loading planner 12 checks whether there are further saved optimization objectives that have not yet been taken into account which are allocated further optimization rules 18. If there exists at least one further optimization objective, the loading planner 12 continues in step S43 in order to determine further loading plans 17 for the production process on the basis of the optimization rules 18 defined by the further optimization objective. Otherwise the loading planner 12 continues in step S48.

In step S48, the loading planner 12 checks whether there are further saved variants of the available operating personnel of the printed product finishing system 2 that have not yet been taken into account. If there exists at least one further variant of available operating personnel, the loading planner 12 continues in step S42 in order to determine for this variant of available operating personnel further loading plans 17 for the production process. Otherwise the loading planner 12 continues in step S49.

In step S49, the loading planner 12 checks whether there are further saved system configuration parameters that have not yet been taken into account which define a further configuration of the printed product finishing system 2. If there exists at least one further configuration of the printed product finishing system 2, the loading planner 12 continues in step S41 in order to define for this configuration further loading plans 17 for the production process. Otherwise the loading planner 12 finishes generating loading plans 17.

The control module 15 is configured to configure and control the printed product processing system 2 for and during a production process.

Figure 5:
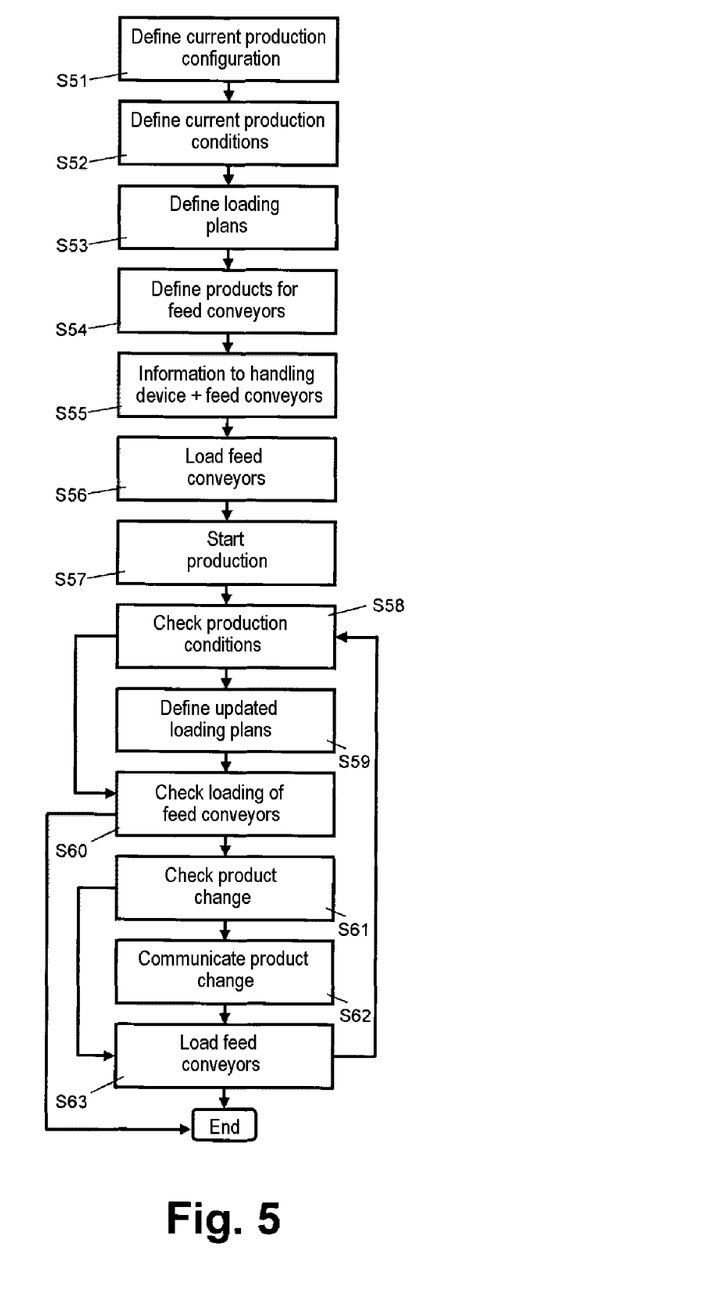
FIG. 5: shows a flow diagram that illustrates an example of a sequence of steps for configuring and controlling a printed product processing system for creating product collections which are supplied by a multiplicity of feed conveyors.

For this purpose, the control module 15 activates the production configurator 11, as illustrated in FIG. 5, in order to define in step S51 the current production configuration 16 for the planned production process or sub-production process. The current production configuration 16 is defined by the production configurator 11, as described above in connection with step S1 (steps S11, S12 and S13), by entering individual parameters or by selecting an already defined production configuration 16 of a production process or sub-production process.

In step S52, the control module 15 activates the system configurator 14 in order to define the current production conditions 19. The current production conditions 19 are defined by the system configurator 14, as described above in connection with step S3 (steps S31, S32 and S33), by entering individual parameters or by selecting already defined production conditions 19.

In step S53, the control module 15 determines the loading plans 17 to be used for the feed conveyors 23 with regard to the current production configuration 16 and the current production conditions 19. For this purpose, the control module 15 selects the loading plans 17, which may already be allocated to the current production configuration 16 and the current production conditions 19, or activates the loading planner 12 in order to generate the loading plans 17 for the current production configuration 16 and the current production conditions 19, as described above in connection with step S4 (steps S44, S45 and S46).

In step S54, the control module 15 determines, from the loading plans 17 to be used, for each of the feed conveyors 23 the first product P1-P6 to be loaded on the feed conveyor 23 for the production process. In the example of the loading plan in table 1, this is the product P3, which must be supplied first to the conveyor 21 by the feed conveyor 23 concerned.

In step S55, the control module 15 displays on the displays 22 of the feed conveyors 23 in each case the product P1-P6 that must be loaded as the first product, for instance before the start of the production process, on the feed conveyors 23 concerned. The product P1-P6 is displayed on the display 22 for example as text information and/or as an image, preferably based on a saved digital image of the product P1-P6 or on a symbolic representation of the product P1-P6, for example a company logo of the company responsible for the product P1-P6, wherein the orientation of the product P1-P6 in which the product P1-P6 is meant to be loaded on the feed conveyor 23 is also preferably displayed. The control module 15 in addition transmits information about the product P1-P6 to be supplied as a product handling job via the wireless communications channel to the mobile display devices 33 of the handling devices 3 or of the computerized hand-held units, which are used, for example, in the stock-management or goods-inwards department. The products P1-P6 to be supplied and which are meant to be moved by the mobile handling devices 3 to the feed conveyors 23 are preferably each displayed graphically on the display 33 of the mobile handling device 3 concerned (or of the computerized hand-held unit). The products P1-P6 to be supplied initially are assigned, for example to the mobile handling devices 3, such that feed conveyors 23, which are each arranged in a common, defined, contiguous local area, are operated by the same mobile handling device 3.

In step S56, the feed conveyors 23 are manually loaded by the operating personnel with the displayed products P1-P6 to be supplied. For this purpose, the pallets P0 holding the products P1-P6 to be supplied are first moved to the feed conveyors 23 by the mobile handling devices 3, and then the feed conveyors 23 are loaded with the products P1-P6 from the pallets P0. The control device 1 and/or the control computer 10 preferably receive confirmation both that the product handling job has been carried out, i.e. one or more requested pallets P0 have been provided, and that the feed conveyors 23 have been loaded with the products P1-P6. Confirmation is performed, for example, manually by the operating personnel or by suitable sensors or the automatic controller of the handling device 3.

In step S57 the production process starts, with the products P1-P6 being supplied to the conveyor 21 by the feed conveyors 23 under the control of the control computer 10 or the control device 1 in accordance with the production configuration in order to create product collections.

In step S58, the control module 15 checks whether there is a change in the current production conditions 19, for example as a result of an intended change, e.g. made by manual intervention, or a change caused by a fault situation or problem, to system configuration parameters and hence to the configuration of the printed product processing system 2, as a result of a changed number of available operating personnel for the printed product processing system 2 or as a result of a changed optimization objective. In other words, the control module 15 or the system configurator 14 continuously monitors and logs the production process and the status of the printed product processing system 2 in order to adapt the current production conditions 19 accordingly if necessary, for example if there are problems with a feed conveyor 23, with processing equipment or with conveying away, or when routes are altered because of changed weather conditions or changes in the availability of a heavy goods vehicle, etc. If the production conditions 19 are unchanged, the control module 15 continues in step S60, otherwise in step S59.

In step S59, the control module 15 determines adapted, updated loading plans 17 from the changed production conditions. The control module 15 here generates for the changed current production conditions 19 a record containing adapted loading plans 17 for the feed conveyors 23, taking into account already supplied products P1-P6 or generated product collections and, if applicable, also already existing loads on the feed conveyors 23, and not regenerating or modifying same. The aim of this process, as a general optimization rule for updating loading plans 17 when production conditions are changed, is to minimize the number of product changes for loading of the feed conveyors 23. Depending on the situation, a running sub-production process is also finished using the existing loading plans 17, and the control module 15 selects a new record of loading plans 17 for the current production conditions only for the next sub-production process, in other words the loading plans 17 are not changed until the point in time or sequence number of the next sub-production process, if certain defined conditions are met, for example the remaining production time for the running sub-production process is less than a defined threshold, or completion of the running sub-production process is technically feasible for the changed production conditions, etc.

In step S60, the control module 15 checks against the current possibly changed loading plans 17 whether further loading of the feed conveyors 23 with products P1-P6 is necessary. For this purpose, sensors, for example, are also used on the feed conveyors 23, which determine and check the current loading of a feed conveyor 23. Depending on the design of the loading sensor, a load amount is here specified as a length dimension, weight and/or quantity, and in one variant, the specific product P1-P6 loaded on the feed conveyor 23 concerned is also determined. If the loading plan 17 of a feed conveyor 23 has not yet been completed, i.e. the feed conveyor 23 for the running production process or sub-production process still needs to be loaded with additional products P1-P16, the control module 15 continues in step S61.

In step S61, the control module 15 checks for each of the feed conveyors 23 on the basis of the loading plans 17 and the current status of the running production process or sub-production process whether and when a product change is imminent for the feed conveyor 23 concerned. In this step, it is determined on the basis of the current number of created product collections for which the feed conveyor 23 concerned is supplying products P1-P6, and on the basis of the loading plan 17 allocated to the feed conveyor 23 concerned, how many of the products P1-P6 in the current loading of the feed conveyor 23 are still meant to be supplied by the feed conveyor 23 before the feed conveyor 23 must supply a different product P1-P6. The control module 15 also checks for the feed conveyors 23, for which a product change is imminent, according to defined conditions whether or not the imminent product change shall already be displayed to the operating personnel of the printed product processing system 2. A product change is displayed, for example, if it must be performed immediately after the current load on the conveyor concerned has been processed. The control module 15 also determines, for example on the basis of the movement route or movement time of a product P1-P6 from its storage location to the feed conveyor 23 concerned and/or on the basis of the current utilization of the mobile handling devices 3, whether communication of an imminent product change and hence a product handling job shall be transmitted already to one or more mobile handling devices 3 (or computerized hand-held units). In one variant, a defined advance warning time, for example ten or fifteen minutes, is used to communicate each imminent product change as a product handling job to one of the mobile handling devices 3. As a general rule it holds that one or more pallets P0 holding the correct product to be supplied are provided at the correct point in time, i.e. when the loading plan specifies loading with the product to be supplied, and at the right location, i.e. at the intended feed conveyor 23. The advance warning time for a product handling job for moving up to a feed conveyor 23 a pallet P0 by a mobile handling device 3 for a product change or replenishment of a product to be supplied is longer than that needed for announcing a product change on a display 22 on a feed conveyor 23, for example twice the value of the time period that is needed, after transmitting a product handling job, by a mobile handling device 3 for the movement to the feed conveyor 23 concerned.

In step S62, the control module 15 transmits a product handling job for an imminent product change or product replenishment in each case to the mobile display device 33 of one of the handling devices 3 (or of the computerized hand-held units). Depending on the advance warning time, the control module 15 additionally transmits information about an imminent product change on the feed conveyor 23 concerned. In this step is transmitted an identifier of the conveyor 23 concerned, an identifier of the product P1-P6 to be moved up or supplied, a graphical representation of this product P1-P6 and a value for the point in time and/or time period until the product P1-P6 concerned must be available at a specified feed conveyor 23, 23' (supply time). The product P1-P6 to be moved up and the time values are displayed on the display 33 of the mobile handling device 3 concerned or of the computerized hand-held unit concerned. The control module 15 also displays, if applicable, on the display 22 of the feed conveyors 23 concerned an imminent product change. An image of the product P1-P6 which is to be loaded on the feed conveyor 23 is preferably displayed on the display 22. In one variant, the orientation of the product P1-P6 in which the product P1-P6 concerned is meant to be loaded on the feed conveyor 23 is also displayed. In one embodiment variant, the control module 15 also displays on the display 22 a time indicator for the imminent product change, for example the number of remaining products P1-P6 that will still be supplied to the conveyor 21 by the feed conveyor 23 before the product change, or a time period that depends thereon. The display 22 is continuously updated so that a decreasing time value synchronized with the production process or a decreasing product quantity is displayed to the operating personnel, for example as a numerical value or graphically.

In a further embodiment variant, the control module 15 is configured, for example in accordance with relevant control commands which are entered at any time during the production process at the feed conveyor 23 by the operating personnel, for instance via a keyboard or a touch-sensitive display, to display on the display 22 the remaining time period until the next change in the type of the product P1-P6 to be supplied by the feed conveyor 23 concerned. For instance, the number of remaining loadings of the feed conveyor 23 with the current product P1-P6 before the next product P1-P6 of a different type needs to be loaded by the operating personnel, is displayed as a numerical value or graphically. In one variant, the control module 15 displays, for example at the instruction of the operating personnel, on the displays 22 of each of the feed conveyors 23 the entire loading plan 17 or a current segment of the allocated loading plan 17. The loading plan 17 containing the sequence of different types of products P3-P1-P4 in time succession is displayed, for example in graphical form, such as illustrated in the example in table 2, where the different products P1-P6 are each represented in a different color and include quantity information, and the current point in time or production status is indicated by a marker. In the example in table 2, the marker shows a production status in which the product P3 has already been processed and supplied to the conveyor 21 by the feed conveyor 23 concerned, and in which the product P1 is currently being supplied.

TABLE 2

| Product and quantity | | |
| --- | --- | --- |
| P3 | P1 | P4 |
| 4000 | 2000 | 1500 |
| ----------------| (marker) | | |

In step S63, the operating personnel load the feed conveyors 23 with the product displayed as the current product on the display 22 in the specified orientation. For the purpose of a product change, one or more (handling) pallets P0, on which are arranged one or more stacks of the product P1-P6 to be supplied, must be moved by the mobile handling devices 3 in good time to the feed conveyor 23 concerned, for example under the control of an operating person or automatically by the handling controller. The handling controller is configured, for example, to control the mobile handling device 3 on receiving a product handling job in such a way that it automatically obtains from a storage location one pallet P0 (or a plurality of pallets P0 in succession), on which are arranged one or more stacks of the product P1-P6 to be supplied, and picks up, lifts and moves said pallet to the feed conveyor 23 concerned, for example along predefined paths. The control device 1 and/or the control computer 10 receive confirmation both that the product handling job has been carried out and that the feed conveyors 23 have been loaded with the products P1-P6 to be supplied.

As shown in FIG. 6, the feed conveyors 23 each have an identifying device 29. The identifying devices 29 enable verification of the allocation of products P1-P6, which are brought up on one or more pallets P0 for the purpose of loading a feed conveyor 23 concerned, to the feed conveyor 23 concerned. The intended, correct allocation of a product P1-P6 of a specific product type to one of the feed conveyors 23 is saved in the control computer 10 or in the control device 1. The allocation is typically time-dependent and changes during the production process. In the context of the above explanations, the loading plans 17, for example, define the allocation for a production process or sub-production process.

Verification of the allocation is based on a machine-readable identifier 29* of the product P1-P6, for example a product identifier 29* in the form of a barcode or an RFID, which is attached directly to the product P1-P6, on the pallet P0 on which is arranged the product P1-P6, or on a stack of the product P1-P6. The machine-readable identifier 29* of the product P1-P6 is recorded using a mobile reader 4 (hand scanner) or using the identifying device 29 of the feed conveyor 23, which identifying device is implemented in this case as an identifier reader. In a further variant, the machine-readable identifier of the product P1-P6 is represented by an image of the product P1-P6, which is captured by an image sensor, e.g. a digital camera, wherein the image sensor is in the form of a mobile reader 4 or is part of the identifying device 29.

In the variants in which the identifier of a product P1-P6 (product identifier) 29* is recorded by the identifying device 29 which is fixed to the feed conveyor 23 and is in the form of an identifier reader or an image sensor, for the purpose of verifying the allocation, verification data containing the recorded product identifier and a feed-conveyor identification allocated to the feed conveyor 23, which identification is stored, for example, in the identifying device 29, is transmitted from the identifying device 29 to the verification module 100 via a communications link.

In the variants in which the identifier of a product P1-P6 (product identifier) 29* is captured and recorded by a mobile reader or image sensor that is not connected to the feed conveyor 23, for the purpose of verifying the allocation of the product P1-P6 to a feed conveyor 23, an identifier of the feed conveyor 23 concerned is also recorded, wherein the identifying device 29 attached to the feed conveyor 23 for this purpose is in the form of a machine-readable identifier. Then, for the purpose of verifying the allocation, verification data containing the recorded product identifier and the recorded machine-readable identifier of the feed conveyor 23 is transmitted from the mobile reader 4 via a contactless (wireless) or contact-based (wired) communications link 40 to the verification module 100, for example via a WLAN (Wireless Local Area Network) or via Bluetooth.

The verification module 100 verifies the allocation of product P1-P6 to feed conveyor 23 on the basis of the transmitted verification data. Depending on the embodiment variant, the verification module is arranged in the control computer 10 or in the control device 1 or as an alternative in the feed conveyors 23. If, on the basis of the stored allocation of product P1-P6 to feed conveyor 23, for example on the basis of the allocated loading plans 17, the verification module 100 establishes that the product P1-P6 defined by the received verification data, and the feed conveyor 23 defined by the verification data do not match the stored allocation which is intended for the current point in time or a defined time period after the current point in time, the verification module 100 sends an appropriate error message via the communications link 40 to the mobile reader 4 and/or to the feed conveyor 23, for example for display on a display of the mobile reader 4 and/or of the feed conveyor 23, and/or for acoustic output of a warning signal. Incorrect loading of the feed conveyors 23 with unintended products P1-P6, in particular at the wrong point in time, can thereby be avoided. Moreover, in one variant in which the product identifier is recorded by the image sensor fixed to the feed conveyor 23, it is possible to stop and prevent the feed of unintended products P1-P6 that have been mistakenly loaded on the feed conveyor 23 concerned.

Finally it should be mentioned that although in the description, computer program code has been assigned to specific functional modules and although the execution of steps has been presented in a specific sequence, a person skilled in the art will understand that the computer program code can have a different structure and the sequence of at least some steps can be changed without deviating from the subject matter for which protection is sought.

The invention claimed is:

1. A computerized control device for controlling a printed product processing system that comprises a collecting system having a conveyor and a plurality of feed conveyors for creating product collections from different types of products supplied by the feed conveyors, the computerized control device having one or more processors configured to execute computer code, characterized by:
 a loading planner for generating and saving one or more loading plans, which define for each of the feed conveyors a time sequence of the products that are to be supplied to the conveyor by the feed conveyor for a defined production process of a plurality of different product collections, each to be created from a plurality of supplied products, and
 a control module, which is configured to determine on the basis of the loading plans the products to be supplied, which are each to be supplied by one of the feed conveyors to the conveyor for creating the product collections, and to transmit via a wireless communications channel in each case to a mobile display device of a mobile handling device for displaying information about the determined products to be supplied to the feed conveyor concerned, wherein the control module is configured to display on a display of the feed conveyor concerned in each case a graphical representation and an orientation of the products to be supplied, and to transmit via the wireless communications channel to the mobile display device information about the products to be supplied, for the purpose of graphical display of the products to be supplied.

2. The device of claim 1, wherein the control module is configured to record during the defined production process the products supplied by the feed conveyors to the conveyor and to determine on the basis of the loading plans an imminent change in the type of the product to be supplied for one of the feed conveyors, and to transmit via the wireless communications channel to the mobile display device information about the product to be loaded on the feed conveyor for the imminent change.

3. The device of claim 1, wherein the control module is configured to determine during the defined production process on the basis of the loading plans a time interval until an imminent change in the type of product to be supplied for one of the feed conveyors, and to transmit said time interval to the mobile display device via the wireless communications channel.

4. The device of claim 1, wherein the loading planner is configured to generate the loading plans for the defined production process according to defined optimization rules.

5. The device of claim 4, wherein the loading planner is configured to determine from the defined optimization rules on the basis of one of a plurality of possible optimization objectives the optimization rules to be used to generate the loading plans.

6. The device of claim 1, wherein the loading planner is configured to generate and save records containing different loading plans for the feed conveyors for different possible production conditions, which define at least one of: a configuration of the printed product processing system, the availability of operating personnel of the printed product processing system and an optimization objective; and in that the control module is configured to record current production conditions of the printed product processing system for the defined production process, and to select one of the records of the loading plans for the defined production process on the basis of the current production conditions.

7. The device of claim 1, wherein the control module is configured to record during the defined production process current production conditions which define at least one of: a current configuration of the printed product processing system, the current availability of operating staff of the printed product processing system and a current optimization objective; and in that the loading planner is configured to adapt the loading plans during the defined production process on the basis of the current production conditions of the printed product processing system.

8. The device of claim 1, wherein the loading planner is configured to generate for the defined production process a plurality of records containing different loading plans for the feed conveyors, in that the control device comprises a simulator which is configured to simulate the defined production process for the different records of loading plans and to determine in each case a simulated production time period, and in that the loading planner is configured to use for the defined production process the record containing loading plans having the shortest simulated production time period.

9. A computer-implemented method for controlling a printed product processing system that comprises a collecting system having a conveyor and a multiplicity of feed conveyors for creating product collections from different types of products supplied by the feed conveyors, the computer-implemented method comprising:

generating and saving in a computerized control device one or more loading plans, which define for each of the feed conveyors a time sequence of the products that are to be supplied to the conveyor by the feed conveyor for a defined production process of a plurality of different product collections, each to be created from a plurality of supplied products, determining in the computerized control device, on the basis of the loading plans, the products to be supplied, which are each to be supplied by one of the feed conveyors to the conveyor for creating the product collections, transmitting via a wireless communications channel in each case to a mobile display device of a mobile handling device for the purpose of bringing up to the feed conveyor concerned the products to be supplied and for displaying information about the determined products to be supplied to the feed conveyor concerned, and displaying on a display of the feed conveyor concerned a graphical representation and an orientation of the products to be supplied, and to transmit via the wireless communications channel to the mobile display device information about the products to be supplied, for the purpose of graphical display of the products to be supplied.

10. The method of claim 9, further comprising recording during the defined production process the products supplied by the feed conveyors to the conveyor, determining in the computerized control device on the basis of the loading plans an imminent change in the type of the product to be supplied for one of the feed conveyors, and transmitting via the wireless communications channel to the mobile display device information about the product to be loaded on the feed conveyor for the imminent change.

11. The method of claim 9, further comprising determining in the computerized control device during the defined production process on the basis of the loading plans, a time interval until an imminent change in the type of product to be supplied for one of the feed conveyors, and transmitting the time interval to the mobile display device via the wireless communications channel.

12. The method of claim 9, further comprising selecting one of a plurality of possible optimization objectives, determining in the computerized control device defined optimization rules on the basis of the one of a plurality of possible optimization objectives, and generating the loading plans in the computerized control device for the defined production according to the determined defined optimization rules.

13. The method of claim 9, further comprising generating and saving in the computerized control device records containing different loading plans for the feed conveyors for different possible production conditions, which define at least one of: a configuration of the printed product processing system, the availability of operating personnel of the printed product processing system and an optimization objective; recording in the computerized control device current production conditions of the printed product processing system for the defined production process, and selecting in the computerized control device one of the records of the loading plans for the defined production process on the basis of the current production conditions.

14. The method of claim 9, further comprising recording in the computerized control device during the defined production process, current production conditions of the printed product processing system which define at least one of: a current configuration of the printed product processing system, the current availability of operating staff of the printed product processing system and a current optimization objective; and adapting in the computerized control device the loading plans during the defined production process on the basis of the current production conditions of the printed product processing system.

15. The method of claim 9, further comprising generating in the computerized control device for the defined production process, records containing different loading plans for the feed conveyors, simulating the defined production process for the different records of loading plans and determining in each case a simulated production time period, and using for the defined production process the record containing loading plans having the shortest simulated production time period.

16. A non-transitory computer readable medium having stored a computer program containing stored computer code, which code is configured to control one or more processors of a control device such that the processors execute a method to control a printed product processing system that comprises a collecting system having a conveyor and a multiplicity of feed conveyors for creating product collections from products supplied by the feed conveyors, the method comprising:

generating and saving in a computerized control device one or more loading plans, which define for each of the feed conveyors a time sequence of the products that are to be supplied to the conveyor by the feed conveyor for a defined production process of a plurality of different product collections, each to be created from a plurality of supplied products, determining in the computerized control device, on the basis of the loading plans, the products to be supplied, which are each to be supplied by one of the feed conveyors to the conveyor for creating the product collections, transmitting via a wireless communications channel in each case to a mobile display device of a mobile handling device for displaying information about the determined products to be supplied to the feed conveyor concerned, and displaying on a display of the feed conveyor concerned a graphical representation and an orientation of the products to be supplied, and to transmit via the wireless communications channel to the mobile display device information about the products to be supplied, for the purpose of graphical display of the products to be supplied.

* * * * *